US008638929B2

(12) United States Patent
Zhang et al.

(10) Patent No.: US 8,638,929 B2
(45) Date of Patent: Jan. 28, 2014

(54) SYSTEM AND METHOD FOR ENCRYPTING AND DECRYPTING DATA

(75) Inventors: Jiang Zhang, La Jolla, CA (US); Geetha Mangalore, San Diego, CA (US); Petr Peterka, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 148 days.

(21) Appl. No.: 12/956,349

(22) Filed: Nov. 30, 2010

(65) Prior Publication Data

US 2011/0129087 A1  Jun. 2, 2011

Related U.S. Application Data

(60) Provisional application No. 61/265,119, filed on Nov. 30, 2009.

(51) Int. Cl.
*H04L 29/06* (2006.01)
(52) U.S. Cl.
USPC .................................. 380/44; 380/28; 380/201
(58) Field of Classification Search
USPC .............................................. 380/44, 28, 201
See application file for complete search history.

(56) References Cited

U.S. PATENT DOCUMENTS

2004/0202322 A1   10/2004   Chavanne et al.
2006/0018465 A1*  1/2006    Saeki et al. ...................... 380/44
2006/0184790 A1   8/2006    Oliveira et al.
2006/0259781 A1*  11/2006   Saeki et al. ...................... 713/189
2009/0092335 A1*  4/2009    Kim et al. ........................ 382/285

OTHER PUBLICATIONS

Internet Streaming Media Alliance Encryption and Authentication Version 2.0, AREA / Task Force: DRM, Nov. 15, 2007, pp. 1-60.*
Apple Computer Ed—Joint Photographic Expert Group(JPEG): "15444-12 Amendment 1 Proposed FDAM Text", Joint Photographic Expert Group Conference, Crowborough: JPEG Forum Ltd, GB, Mar. 26, 2004, all pages.
Harald Fuchs et al.: "Encrypted Content Format for Protected Music Player MAF", ITU Study Group 16-Video Coding Experts Group—ISO/IEC MPEG & ITU-T VCEG(ISO/IEC JTC1/SC291WG11 and ITU-T SG16 06), XX, XX, No. M12971, Jan. 11, 2006, all pages.

* cited by examiner

*Primary Examiner* — Michael Pyzocha

(57) ABSTRACT

A method is provided for creating an encrypted data file from a data file having a sample entry box and a media data box. The sample entry box has description information therein. The media data box includes media data therein. The method includes: receiving the data file; encrypting the media data within the media data box with an encryption key; replacing the sample entry box with an encoded box; creating a sinf box within the encoded box; creating a form a box within the sinf box; and creating an schm box within the sinf box. The schm box indicates the type of formatting of the encrypted media data. The encoded box does not include an initial counter that may be used to decrypt the encrypted media data.

13 Claims, 5 Drawing Sheets

SYSTEM AND METHOD FOR ENCRYPTING AND DECRYPTING DATA

The present application claims priority from U.S. Provisional Application No. 61/265,119 filed Nov. 30, 2009, the entire disclosure of which is incorporated herein by reference.

BACKGROUND

The present invention relates to encrypting and decrypting media files having two portions: a media data portion and a meta data portion, having information related to the media data. For purposes of discussion, a non-limiting example of MPEG 4 files will be described herein.

MPEG-4 is a collection of methods defining compression of audio and visual (AV) digital data, i.e., media data. It was introduced in late 1998 and designated a standard for a group of audio and video coding formats and related technology agreed upon by the Moving Picture Experts Group (MPEG) under the formal standard ISO/IEC 14496—Coding of audiovisual objects. Uses of MPEG-4 include compression of AV data for web (streaming media) and compact disk (CD) distribution, voice (telephone, videophone) and broadcast television applications.

A person may transfer digital media data to another person with rights regarding the use of the digital media data. These digital rights govern the use of the digitized content, non-liming examples of which include constraints that may be placed on copying ability, number of plays and the time period of usage. To further ensure that only the intended recipient will have access to the digital media data, the digital media data may be encrypted. There are many known encryption algorithms for use with digital media data. Further, media data that has been encoded with the MPEG 4 encoding standard may be encrypted. This will be described in greater detail below with reference to FIGS. 1-5.

FIG. 1 illustrates an example prior art media delivery system 100.

As illustrated in the figure, system 100 includes a transmission side 102, a receiving side 104 and a communication network 106. Transmission side 102 includes a content source 108, an encoder 110, an encryptor 112, a digital rights management (DRM) device 114 and a transmitter 116. Receiving side 106 includes a receiver 118, a decryptor 120, a DRM device 122, a decoder 124 and a media player 126.

Communication between any of the elements of media delivery system 100 may be accomplished by way of any known communication media. Signals typically embody computer-readable instructions, data structures, program modules, or other data in a modulated data signal such as a carrier wave or other transport mechanism and include any information-delivery media. Non-limiting examples of communications media between any of the elements of media delivery system 100 include wired media, such as wired networks and direct-wired connections, and wireless media such as acoustic, radio-frequency, infrared, etc. The term "tangible computer-readable media" as used herein includes both storage and communications media.

Further, in some embodiments at least one of the elements of media delivery system 100 may be implemented as tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (hardwired and/or wireless, or a combination of hardwired or wireless) to a computer, the computer properly views the connection as a tangible computer-readable medium. Thus, any such connection is properly termed a tangible computer-readable medium. Combinations of the above should also be included within the scope of tangible computer-readable media.

Network 106 is arranged to permit communication between transmission side 102 and receiving side 104.

Content source 108 provides media content data. Encoder 110 is arranged to receive uncompressed content 128 and output compressed content 130. Encryptor 112 is arranged to receive compressed content 130. DRM device 114 is arranged to output a content key 132 and an encrypted content key 134. Encryptor 112 is additionally arranged to receive content key 132 and to output encrypted compressed content 136. Transmitter 116 is arranged to receive encrypted compressed content 136 and encrypted content key 134 and to output encrypted compressed content and encrypted content key 138.

Encrypted compressed content and encrypted content key 138 on transmission side 102 corresponds to encrypted compressed content and encrypted content key 140 on receiving side 104. Encrypted compressed content 136 on transmission side 102 corresponds to encrypted compressed content 142 on receiving side 104. Encrypted content key 134 on transmission side 102 corresponds to encrypted content key 144 on receiving side 104. Content key 132 on transmission side 102 corresponds to content key 146 on receiving side 104. Compressed content 130 on transmission side 102 corresponds to compressed content 148 on receiving side 104. Uncompressed content 128 on transmission side 102 corresponds to uncompressed content 150 on receiving side 104.

Network 106 is arranged to receive encrypted compressed content and encrypted content key 138 and to output encrypted compressed content and encrypted content key 140.

Receiver 118 is arranged to receive encrypted compressed content and encrypted content key 140, to output encrypted compressed content 142 and to output encrypted content key 144. DRM device 122 is arranged to receive encrypted content key 144 and output content key 146. Decryptor 120 is arranged to receive encrypted compressed content 142 and content key 146 and output compressed decrypted content 148. Decoder 124 is arranged to receive compressed decrypted content 148 and output uncompressed decrypted content 150. Media player 126 is arranged to receive uncompressed decrypted content 150.

In operation, transmission side 102 creates media content as an MPEG 4 data file. Non-limiting examples of types of creation include: creating media content as a signal for wired transmission, such as over the Internet or over a telephone line; creating media content as a signal for wireless transmission including broadcast to television; and storing media content on a tangible readable medium that may be read by a tangible medium reader such as a computer.

Network 106 may therefore be any system or arrangement that enables transmission of the MPEG 4 file from transmission side 102 to receiving side 106. Non-limiting examples of types of networks include a wired network, such as the Internet or a telephone network and a cable or satellite broadcast network.

Receiving side 104 decodes a MPEG 4 data file into the original media content for use by a media player. Non-limiting examples of types of MPEG 4 media players include: audio, video and data players.

Returning to transmission side 102, content source 108 may be any source that is capable of generating digital data—including digital audio and digital video (digital AV data). The digital data is provided as a stream of digital bits. This digital stream may be very large. So large, in fact, that transmission or storage may take too much time, energy and (digital storage) space to manage. Accordingly, a compression of the data is used to manage data for transmission or storage. The digital data created by content source 108 is provided as uncompressed content 128 to encoder 110.

Encoder 110 encodes uncompressed content 128, i.e., arranges uncompressed content 128 into an MPEG 4 file having a media data portion and a metadata portion. The media data portion is normally a compressed version of uncompressed content 128. The metadata portion includes information on the arrangement of the compressed version of uncompressed content 128. The metadata portion enables an MPEG 4 decoder to recognize the MPEG 4 file and decompress the compressed version of uncompressed content 128 to retrieve the original uncompressed content 128.

In accordance with the ISO standard for MPEG 4, when uncompressed media data is encoded, it is arranged as a structured data file having a media data portion and a metadata portion. The media data portion includes a compressed form of the uncompressed media data. The metadata is used by an MPEG 4 decoder to decompress the compressed form of the uncompressed media data to recreate the uncompressed media data. The MPEG 4 file is structured as a sequence of objects; some of which may contain other objects. The sequence of objects in the file contains exactly one presentation metadata wrapper (the Movie Box). It is a top level box in the file and usually easy to locate. This will be described in greater detail below with reference to FIG. 2.

FIG. 2 is a representation of an example prior art MPEG4 file 200. File 200 includes a ftyp box 202, a mdat box 204, and a moov box 206. Moov box 206 includes a trak box 208 and a trak box 210. Trak box 208 includes a mdia box 212, which includes a minf box 214, which includes a stbl box 216, which includes a stsd box 218, which includes an MP4V box 220. Trak box 210 includes a mdia box 222, which includes a minf box 224, which includes a stbl box 226, which includes a stsd box 228, which includes an MP4A box 230.

A ftyp box, such as ftyp box 202, provides information related to a file type and compatibility. A mdat box, such as mdat box 204, is the media data container having the digital media data therein. A moov box, such as moov box 206, is a container for the metadata for the media presentation. A trak box, such as trak box 208 and a trak box 210, is a container for an individual track or stream. A mdia box, such as mdia box 212 and mdia box 222, is a container for the media information in a track. A minf box, such as minf box 214 and minf box 224, is a media information container. A stbl box, such as stbl box 216 and stbl box 226, is a sample table box, which is a container for a time/space map. A stsd box, such as stsd box 218 and stsd box 228, contains sample descriptions such as codec types, initialization, etc. In this example, stsd box 218 includes an MP4V box 220 that indicates that the compressed media data within trak 208 is video data that has been compressed with the MPEG 4 standard, whereas stsd box 228 includes an MP4A box 230 that indicates that the compressed media data within trak 210 is audio data that has been compressed with the MPEG 4 standard.

Returning to FIG. 1, after encoder 110 encodes uncompressed content 128, the MPEG 4 file is output as compressed content 130. At this point, the compressed file may be delivered to transmitter 116 for transmission through network 106 to receiving side 104. However, in some cases, the person creating compressed content 130 may want to prevent others from gaining access thereto. Accordingly, compressed content 130 may be encrypted prior to transmission. This is accomplished by way of encryptor 112 and DRM device 114.

To encrypt compressed content 130, DRM device 114 provides content key 132 to encryptor 112. Encryptor 112 may use content key 132 to encrypt compressed content 130 by any encryption method known by the encryptor 112 and decryptor 120. A non-limiting encryption method that will be used for purposes of discussion hereinafter is the Advanced Encryption Standard (AES), which is a symmetric-key encryption standard. This will be described in greater detail below with reference to FIG. 4.

DRM device 114 is used manage the digital rights information of the content within the media data, i.e., the DRM information. Non-limiting examples of DRM information may include restrictions on the number of times that media content may be played, restrictions on the number of times that media content may be copied or transferred, restrictions on devices that media content is allowed to be copied or transferred to, and restrictions on the length of time that media content can be used from when it was first downloaded or first viewed. DRM device 114 may manage the DRM information by attaching the DRM information to the media data. An authorized receiver of the media data (and DRM information) will have only the conditional access to the media data as defined in the DRM information. DRM device 114 will additionally perform a hand-shake 152 with DRM device 122 on receiver side 104. A non-limiting example of the hand-shake 152 includes exchanging authentications such as with the Public Key Infrasbrucuture (PKI) and establishing a session key between DRM Device 114 and DRM Device 122. As a result of hand-shake 152, in this example, receiving side 104 will be an authorized receiver of the media data, and will therefore have the digital rights to access the content as defined in the DRM information. Further, during hand-shake 152, DRM device 114 will provide to DRM device 122 a key needed to decrypt encrypted content key 144.

In accordance with the MPEG 4 standard, when an MPEG 4 media data media data file is encrypted, the media data is encrypted and metadata is changed somewhat. This will now be described in greater detail below with reference to FIG. 3.

FIG. 3 is a representation of an example prior art encrypted MPEG4 file 300. File 300 includes ftyp box 202, an mdat box 322 and moov box 206. Moov box 206 includes a trak box 208 and trak box 210. Trak box 208 includes mdia box 212, which includes minf box 214, which includes stbl box 216, which includes stsd box 218, which includes an encv box 302, which includes a sinf box 304, which includes a form a box 306, a schm box 308 and an imif box 310. Trak box 210 includes mdia box 222, which includes minf box 224, which includes stbl box 226, which includes stsd box 228, which includes an enca box 312, which includes a sinf box 314, which includes a form a box 318, a schm box 316 and an imif box 320.

File 300 has similarities with file 200 of FIG. 2. The differences are easy to note. File 300 includes encv box 302 in place of mp4v box 220 of file 200. File 300 additionally includes enca box 312 in place of mp4a box 230 of file 200. Encv box 302 indicates that track 208 corresponds to encrypted video data, where enca box 312 indicates that trak 210 corresponds to encrypted audio data. A sinf box, such as sinf box 304 and sinf box 314, provides information related to the protection scheme. A form a box, such as form a box 306 and 318, is the original format box having information related to the original format of the compressed digital media data within mdat box 322. An imif box, such as imif box 310 and imif box 320, has additional information for Intellectual Property Management Protection, which may include an initial counter. In this example, an initial counter will be located in DRM device 122. A schm box, such as schm box 308 and a schm box 316, is a scheme type box having information related to the protection scheme. In this example, as indicated above, the protection scheme is AES. Finally, mdat box 322 includes encrypted media data corresponding to the nonencrypted data within mdat box 204 of FIG. 2.

Encryptor 112 creates file 300 from compressed content 130 by using content key 132. However, returning to FIG. 2, encryptor 112 does not encrypt the metadata of file 200, i.e., all the boxes with the exception of mdat box 204. Accordingly, encryptor 112 is able to determine where the media data is located, i.e. the location of mdat box 204, and only encrypt the media data. Encryptor 112 encrypts only the media data of an MPEG 4 file by using a counter to determine the location of the media data. This will be described in greater detail with reference to FIG. 4.

FIG. 4 is an exploded view of encryptor 112 of example prior art media delivery system 100 of FIG. 1.

As illustrated in FIG. 4, encryptor 112 is arranged to receive unencrypted data 402 corresponding to mdat box 204 (from compressed content 130), an initial counter 404 (from compressed content 130) and content key 132. Encryptor 112 is arranged to output encrypted compressed content 136.

Further, in some embodiments encryptor 112 may be implemented as tangible computer-readable media for carrying or having computer-executable instructions or data structures stored thereon.

In an example embodiment, encryptor 112 performs AES counter mode encryption. In other embodiments, other modes of AES encryption may be performed. In still other embodiments, other encryption methods may be used.

In the example embodiment, wherein encryptor 112 performs AES counter mode encryption, content key 132 is used to encrypt blocks of data as the key stream and then the key stream is used to XOR with the unencrypted data 402. The initial block is encrypted using initial counter 404. Subsequent blocks are encrypted with subsequent increments of initial counter 404. The resulting output is a plurality of encrypted blocks of data as encrypted compressed content 136.

Returning to FIG. 1, once file 300 is created, encryptor 112 provides encrypted compressed content 136 to transmitter 116 for transmission as encrypted compressed content 138. Further, DRM device provides encrypted key 134 to transmitter 116 for transmission to receiving side 104. The encrypted key 134 is encrypted using the key exchanged between the DRM Server 114 and the DRM Client 122 through handshake 152. Encrypted content key 134 is the counterpart to content key 132 that will enable decryptor 120 to decrypt file 300. This will be described in greater detail below. Any known content key exchange method may be used.

Receiver 118 receives encrypted compressed content and encrypted content key 140, provides encrypted content key 144 to DRM device 122 and provides encrypted compressed content 142 to decryptor 120.

Having already completed a hand-shake with DRM device 114, DRM device 122 has a key for decrypting encrypted content key 144. When decryptor 120 receives content it parses the file. Returning to FIG. 3, if decryptor 120 identifies the content is an encrypted compressed content, for example it contains an encv box 302, then decryptor 120 will decrypt the file. To decrypt the file, decryptor 120 will first find the sinf box inside the encv box and identify the protection scheme to locate the corresponding DRM device 122. DRM device 122 will further decrypt the encrypted content key 144 and identify the initial counter, for example from imif box 310 of encrypted media file 142 (or imif box 320 for trac 210), or inform decryptor 120 how to identify the initial counter from encrypted media file 142. Later DRM device 122 provides content key 146, and the initial counter if needed, to decryptor 120.

Decryptor 120 only decrypts the encrypted media data of an MPEG 4 file by using content key 146 and the initial counter from DRM Client 122 or from encrypted media file 142, for example from imif box 310. In fact, decryptor 120 is very similar to encryptor 112, with the exception that the XOR devices perform an exclusive OR operation on the key stream and the encrypted data (as opposed to the non encrypted data as discussed above with reference to FIG. 4.). This will be described in greater detail with reference to FIG. 5.

FIG. 5 is an exploded view of decryptor 120 of example prior art media delivery system 100 of FIG. 1.

As illustrated in FIG. 5, decryptor 120 is arranged to receive encrypted data 502 corresponding to mdat box 322 (from encrypted compressed content 142), an initial counter 504 (from encrypted compressed content 142) and content key 146. Encryptor 120 is arranged to output decrypted compressed content 148.

Further, in some embodiments decryptor 120 may be implemented as tangible computer-readable media for carrying or having computer-executable instructions or data structures stored thereon.

In an example embodiment, decryptor 120 performs AES counter mode decryption. In other embodiments, other modes of AES decryption may be performed. In still other embodiments, other decryption methods may be use.

In the example embodiment, wherein decryptor 112 performs AES counter mode decryption, content key 146 is used to encrypt blocks of data to generate the key stream and then uses the key stream to XOR with encrypted data 502. The initial block is encrypted using initial counter 504. Subsequent blocks are encrypted with subsequent increments of initial counter 504. The resulting output is a plurality of decrypted blocks of data as decrypted compressed content 148.

Once decrypted, decryptor 120 provides compressed content 148 to decoder 124. Decoder 124 converts compressed content 148 to uncompressed content 150. In particular, using the MPEG 4 standard, decoder 124 uses the metadata within file 200 to decompress the media data within mdat box 204. As a result, uncompressed content 150 corresponds to the original uncompressed stream of data, i.e., uncompressed content 128 on the transmission side.

Media play 126 may then use uncompressed content 128. Non-limiting examples of use of uncompressed data include displaying a video, playing audio, or executing a program.

What is needed is a system and method for providing additional protection to a delivery of media data files.

BRIEF SUMMARY

In accordance with example embodiments of the present invention, a system and method is provided for enabling additional protection to a delivery of media data files.

In accordance with one aspect of the present invention, a method provided for creating an encrypted data file from a data file having a sample entry box and a media data box. The sample entry box has description information therein. The media data box includes media data therein. The method includes: receiving the data file; encrypting the media data within the media data box with an encryption key; replacing the sample entry box with an encoded box; creating a sinf box within the encoded box; creating a form a box within the sinf box; and creating an schm box within the sinf box. The schm box indicates the type of formatting of the encrypted media data. The encoded box does not include an initial counter that may be used to decrypt the encrypted media data.

In accordance with one aspect of the present invention, a method provided for creating a data file from an encrypted data file, an encrypted key seed and intellectual property rights data. The encrypted data file has an encoded box and an encrypted media data box. The encoded box has a sinf box therein, wherein the sinf box has therein a form a box and a schm box. The encrypted media data box has encrypted media data therein. The schm box indicates the type of formatting of the encrypted data file. The method includes: receiving the encrypted data file; receiving the encrypted key seed; receiving the encrypted intellectual property rights data; determining the encryption scheme from the schm box; deriving a content decryption key based on the encrypted key seed and the intellectual property rights data; deriving an initial counter based on the encrypted key seed and data within the encrypted data file; decrypting, via the initial counter and the content decryption key, the encrypted media data within the encrypted media data box; and replacing the encoded box with a sample entry box.

In accordance with one aspect of the present invention, a device is provided for use with an encoder and with an intellectual property rights management device. The encoder can provide a media data file and a file offset, whereas the intellectual property rights management device can provide an encryption key seed. The media data file has media data therein. The device includes an encrypting portion, a salting key derivation portion, an content encryption key derivation portion, and an initial counter generating portion. The encrypting portion is arranged to receive the media data. The salting key derivation portion can derive a salting key based on the encryption key seed. The content encryption key derivation portion can derive a content encryption key based on the encryption key seed and the digital rights information assigned to the content. The initial counter generating portion can generate an initial counter based on the salting key and the file offset. The encrypting portion can further encrypt the media data based on the initial counter and the content encryption key.

In accordance with one aspect of the present invention, a device is provided for with a receiver and with an intellectual property rights management device. The receiver can provide an encrypted media data file and a file offset, whereas the intellectual property rights management device can provide an encryption key seed. The encrypted media data file has encrypted media data therein. The device includes a decrypting portion, a salting key derivation portion, a content decryption key derivation portion and an initial counter generating portion. The decrypting portion is arranged to receive the encrypted media data. The salting key derivation portion can derive a salting key based on the encryption key seed. The content decryption key derivation portion can derive the content decryption key based on the encryption key seed. The initial counter generating portion can generate an initial counter based on the salting key and the file offset. The decrypting portion can further decrypt the encrypted media data based on the initial counter and the content decryption key.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with aspects of the present invention, a system and method is provided for encrypting a media data file based on the DRM information associated with the media data.

In accordance with aspects of the present invention, a system and method is provided for encrypting an MPEG 4 data file without providing an initial counter (or initial vector, for example, in the case of AES CBC encryption) within the MPEG 4 data file. In accordance with an aspect of the present invention, the initial counter (or initial vector) that is used by a decryptor is not passed from the transmission side to the receiver side. On the contrary, in accordance with aspects of the present invention, the initial counter is generated on the transmitter side and the receiver side. As a result, if the encrypted MPEG 4 file is obtained by someone without authority to decrypt and view the information, that person will not have the initial counter and with therefore not be able to correctly decrypt the data. Also the encryption and decryption process is simplified by not adding the initial counter or initial vector into the media file compared to conventional methods that need to insert the initial counter or initial vector into the media file.

An example embodiment of an MPEG 4 encryption/decryption system and method in accordance with aspects of the present invention will now be described with reference to FIGS. 6-12.

Figure 6:
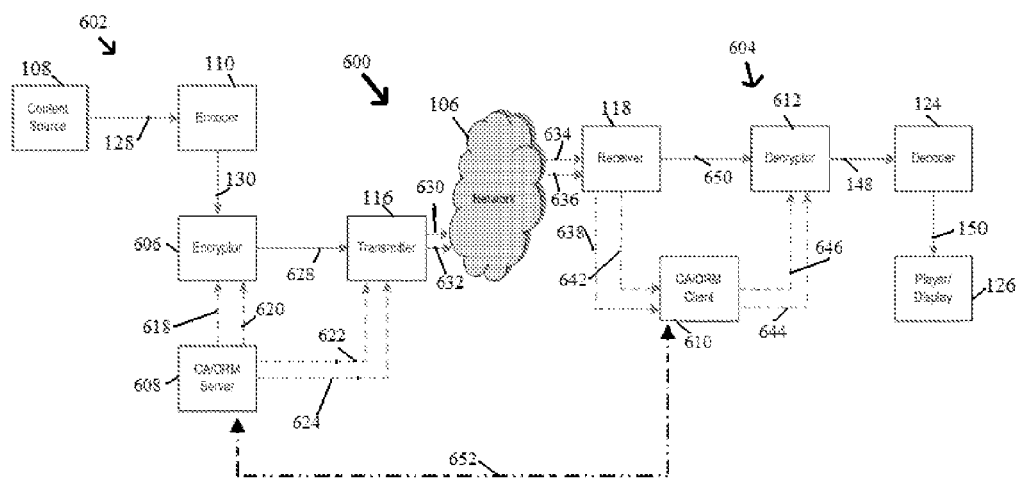
FIG. 6 illustrates an example media delivery system in accordance with an aspect of the present invention.

FIG. 6 illustrates an example media delivery system 600 in accordance with an aspect of the present invention.

As illustrated in the figure, system 600 includes a transmission side 602, a receiving side 604 and a communication network 106. Transmission side 602 includes content source 108, encoder 110, an encryptor 606, a digital rights management (DRM) device 608 and transmitter 116. Receiving side 604 includes receiver 118, a decryptor 612, a DRM device 610, decoder 124 and media player 126.

Communication between any of the elements of media delivery system 600 may be accomplished by way of any known communication media. Signals typically embody computer-readable instructions, data structures, program modules, or other data in a modulated data signal such as a carrier wave or other transport mechanism and include any information-delivery media.

Further, in some embodiments at least one of the elements of media delivery system 600 may be implemented as tangible computer-readable media for carrying or having computer-executable instructions or data structures stored thereon.

Network 106 is arranged to permit communication between transmission side 602 and receiving side 604.

Encryptor 606 is arranged to receive compressed content 130, a content encryption key 618 and a salting key 620 and to output encrypted compressed conent 628. DRM device 608 is arranged to output content encryption key 618, salting key 620, encrypted content key seed 624 and encrypted DRM information 622. Transmitter 116 is arranged to receive encrypted compressed content 628, encrypted DRM information 622 and encrypted content key seed 624. Transmitter 116 is additionally arranged to output encrypted compressed content 630 and encrypted DRM information 622 and encrypted content key seed 624 indicated together as encrypted information 632. Alternatively, DRM information can also be transmitted without any encryption, and predefined data that is used in deriving the salting key may not necessarily need to be transmitted, as it can be pre-defined as a certain constants inside both DRM device 608 and DRM device 610. In another embodiment, the predefined data used in deriving the salting key can be encrypted by DRM device 608 and transmitted to the DRM device 610.

Network 106 is arranged to receive encrypted compressed content 630 and encrypted information 632 and to output them as encrypted compressed content 634 and encrypted information 636, respectively.

Receiver 118 is arranged to receive encrypted compressed content 634 and encrypted information 636, to output encrypted compressed content 650, and to output encrypted DRM information 638 and encrypted content key seed 642. DRM device 610 is arranged to receive encrypted DRM information 638 and encrypted content key seed 642 and to output content decryption key 646 and salting key 644. Decryptor 612 is arranged to receive encrypted compressed content 650, content decryption key 646 and salting key 644 and to output compressed decrypted content 148. Decoder 124 is arranged to receive compressed decrypted content 148 and output uncompressed decrypted content 150. Media player 126 is arranged to receive uncompressed decrypted content 150.

Encrypted compressed content 630 on transmission side 602 corresponds to encrypted compressed content 634 on receiving side 604. Encrypted information 632 on transmission side 602 corresponds to encrypted information 636 on receiving side 604. Encrypted compressed content 628 on transmission side 602 corresponds to encrypted compressed content 650 on receiving side 604. Encrypted DRM information 622 on transmission side 602 corresponds to encrypted DRM information 638 on receiving side 604. Encrypted content key seed 624 on transmission side 602 corresponds to encrypted content key seed 642 on receiving side 604. Content encryption key 618 on transmission side 602 corresponds to content decryption key 646 on receiving side 604. Salting key 620 on transmission side 602 corresponds to salting key 644 on receiving side 604. Compressed content 130 on transmission side 102 corresponds to compressed content 148 on receiving side 104. Uncompressed content 128 on transmission side 102 corresponds to uncompressed content 150 on receiving side 104.

In operation, transmission side 602 creates media content as an MPEG 4 data file. Non-limiting examples of types of creation include: creating media content as a signal for wired transmission, such as over the Internet or over a telephone line; creating media content a signal for wireless transmission including broadcast to television; and storing media content on a tangible computer-readable media.

Network 106 may therefore be any system or arrangement that enables transmission of the MPEG 4 file from transmission side 602 to receiving side 604.

Receiving side 604 decodes a MPEG 4 data file into the original media content for use by a media player. Non-limiting examples of types of MPEG 4 media players include: audio, video and data players.

Figure 1:
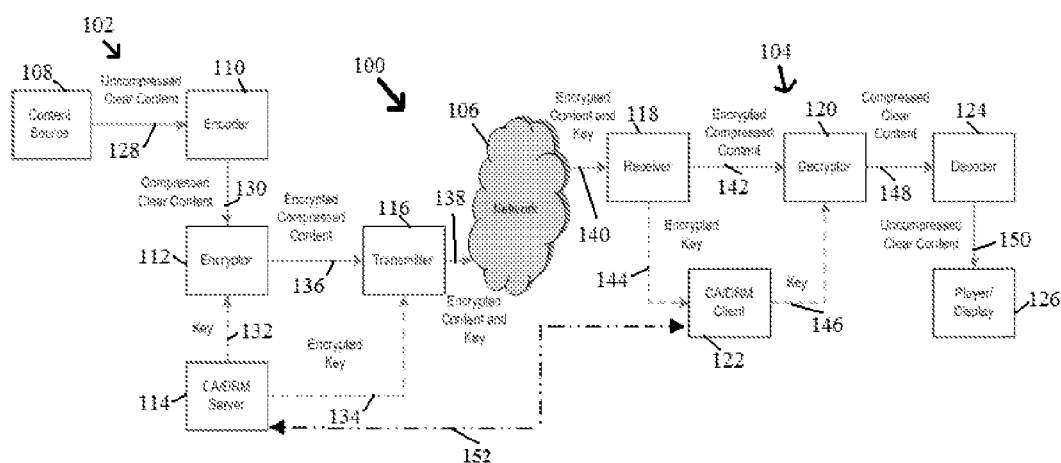
FIG. 1 illustrates an example prior art media delivery system.
Figure 2:
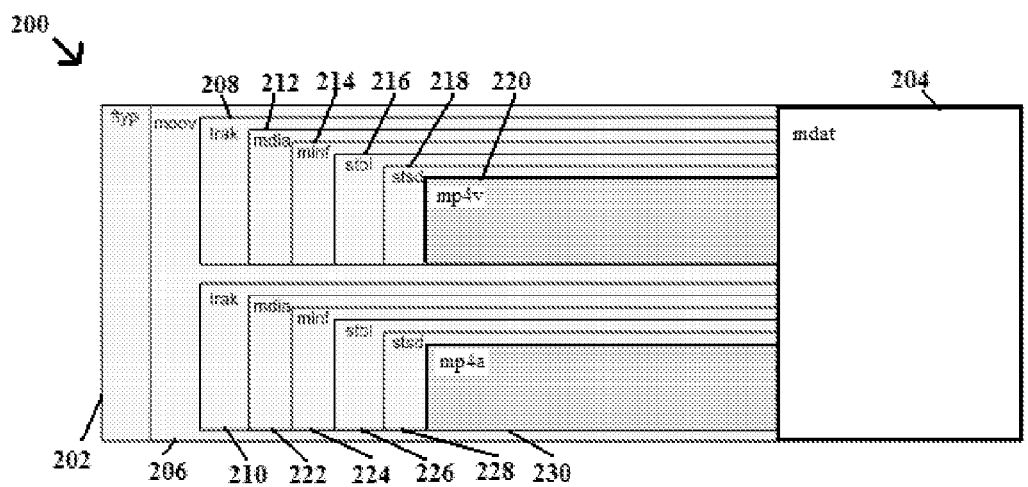
FIG. 2 is a representation of an example prior art MPEG4 file.

Returning to transmission side 602, content source 108 and encoder 110 operate in a manner similar to that as discussed above with reference to FIG. 1. However, encryptor 606 and DRM device 608 operate in a different manner than encryptor 112 and DRM device 114, respectively, of FIG. 1.

To encrypt compressed content 130, DRM device 608 provides content encryption key 618 and salting key 620 to encryptor 606.

Encryptor 606 may use content encryption key 618 and salting key 620 to encrypt compressed content 130 by any known encryption method. A non-limiting encryption method that will be used for purposes of discussion hereinafter is the Advanced Encryption Standard (AES), which is a symmetric-key encryption standard. This will be described in greater detail below with reference to FIG. 9.

DRM device 608 is used to manage the DRM information. It may help to retrieve or assign the DRM information to the content and pass the DRM information to DRM device 610 on receiving side 604. DRM device 610 may manage the DRM information on receiving side 604 by verifying and enforcing the DRM information to the media data. An authorized receiver of the media data (and DRM information) will have only the conditional access to the content as defined in the DRM information.

In contrast to the prior art system discussed above with reference to FIG. 1, in accordance with aspects of the present invention, DRM device 608: generates content encryption key 618 from a content key seed and DRM information; generates salting key 620 from the content key seed and predefined data; and provides content encryption key 618 and salting key 620 to encryptor 606. DRM information, in a practical sense will be a string of digital bits that can be interpreted into a set of DRM rules applied to the media content by DRM device 610. These bits may be used as input into a key derivation device to generate a key. Accordingly, the generated content encryption key will be based on the DRM information. With this technique, a receiver that is able to unlock the content (as a result of having the correct DRM information) will be able to be additionally authenticating and enforcing the DRM information. This will be described in more detail below with reference to FIG. 9.

DRM device 608 will additionally perform a hand-shake 652 with DRM device 610 on receiver side 604. Hand-shake 652 includes authentication of DRM device 610 such as with the Public Key Infrastrucuture (PKI) and digital certificates. As a result of hand-shake 652, in this example, receiving side 104 may be an authorized receiver of the media data, and may therefore have the conditional access to the content as defined in the DRM information. Further, during hand-shake 652, DRM device 608 will provide DRM device 610 with keys, which are needed to decrypt encrypted DRM information 638 and encrypted content key seed 642. If the predefined data is also encrypted and transmitted, the exchanged key between DRM device 608 and DRM device 610 can also be used to decrypt the encrypted predefined data.

In accordance with the MPEG 4 standard, when an MPEG 4 media data file is encrypted, the media data is encrypted and metadata is changed somewhat. Further, in accordance with aspects of the present invention, the metadata is changed as compared to that discussed above with reference to FIG. 3.

In accordance with an aspect of the present invention, and while staying within the MPEG 4 standard, when an MPEG 4 media data file is encrypted, the media data is encrypted and metadata is changed somewhat, but the initial counter is not provided within the encrypted MPEG 4 file. This will be described in greater detail below with reference to FIG. 7.

Figure 7:
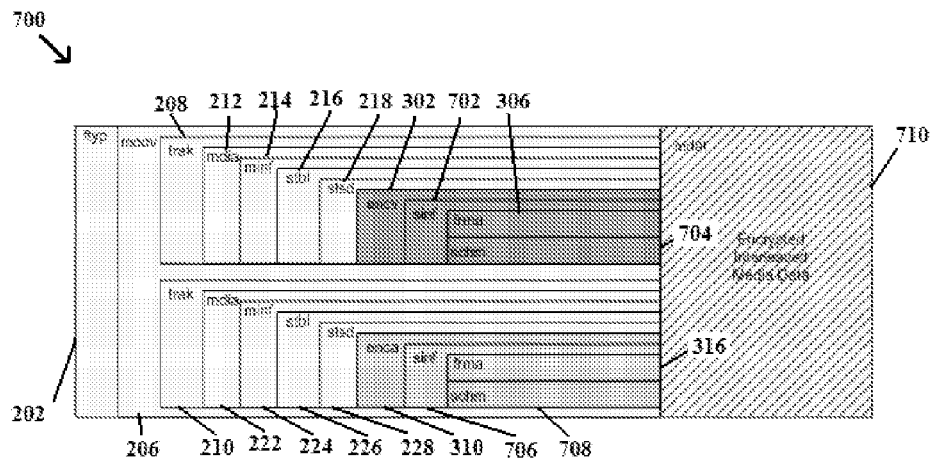
FIG. 7 is a representation of an example encrypted MPEG4 file in accordance with an aspect of the present invention.

FIG. 7 is a representation of an example encrypted MPEG4 file 300 in accordance with an aspect of the present invention. File 700 includes ftyp box 202, an mdat box 710, and moov box 206. Moov box 206 includes trak box 208 and trak box 210. Trak box 208 includes mdia box 212, which includes minf box 214, which includes stbl box 216, which includes stsd box 218, which includes encv box 302, which includes a sinf box 702, which includes a form a box 306 and a schm box 704. Trak box 210 includes mdia box 222, which includes minf box 224, which includes stbl box 226, which includes stsd box 228, which includes enca box 312, which includes a sinf box 706, which includes a form a box 318 and a schm box 708.

Figure 3:
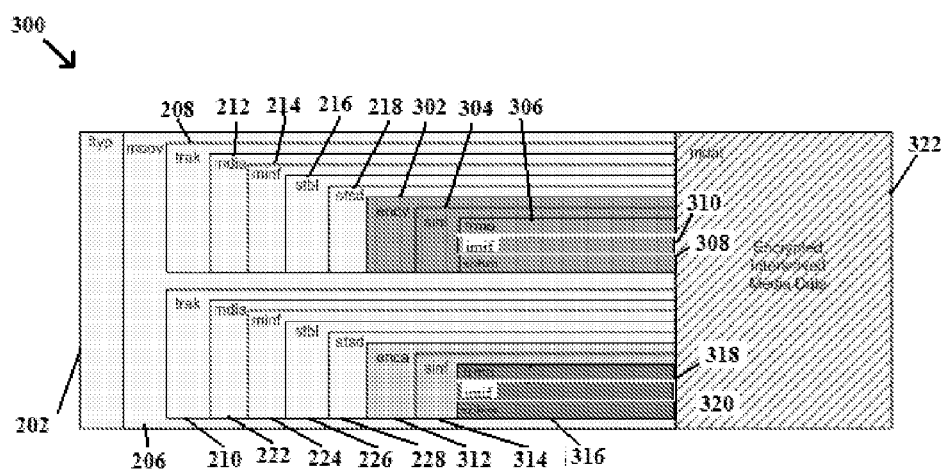
FIG. 3 is a representation of an example prior art encrypted MPEG4 file.

File 700 has similarities with file 300 of FIG. 3. The differences are easy to note. In file 700, the sinf box, for example sinf box 702 and sinf box 706, does not include an imif box. This is because in accordance with an aspect of the present invention, file 700 needs no indicator of information related to the intellectual property rights. As will be described later, this information will be provided at receiver side 604, by way of DRM device 610. DRM device 610 may retrieve the intellectual property rights information based on the file information or content identifier of the media data file such as the file path or an assigned identifier. Further, the schm box, for example schm box 704 and schm box 708, will have information relating to the content protection scheme and its version number, as will be described in greater detail below with reference to FIG. 12. Finally, the encrypted data within the mdat box, in this example mdat box 710, differs somewhat from the encrypted data within mdat box 322 of FIG. 3 as a result of the difference between encryptor 606 and encryptor 112, as will be described in greater detail with reference to FIG. 9.

When encrypted, the sample entry box is changed (and indicated in the drawing as an encv box), and has additional boxes created therein. This will be described in greater details below with reference to FIG. 8.

Figure 8:
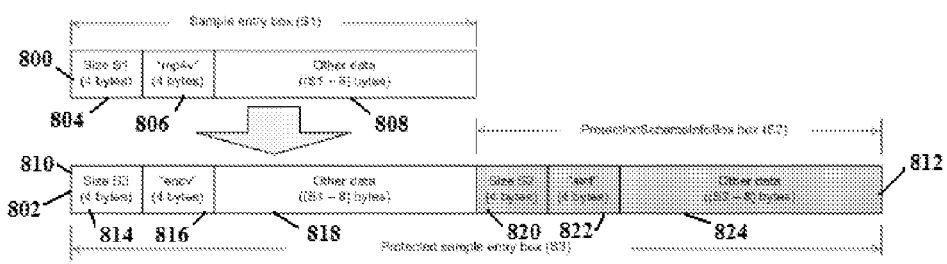
FIG. 8 illustrates an example sample entry box transformation to an encrypted sample entry box in accordance with an aspect of the present invention.

FIG. 8 illustrates an example sample entry box transformation to a protected sample entry box in accordance with an aspect of the present invention.

FIG. 8 includes a sample entry box 800 and a protected sample entry box 802. Sample entry box 800 includes a size field 804, an encoding type field 806 and an other data field 808. Protected sample entry box 802 includes an original sample entry portion 810 and a protection scheme information portion 812. Original sample entry 810 includes a size field 814, an encrypting type field 816 and an other data field 818. Protection scheme information portion 812 includes a size field 820, a sinf field 822 and an other data field 824. This sample entry box transformation will increase the size the box, and consequently will increase the size of all the boxes that this sample entry box is embedded in. Therefore, all the size of those boxes who has embedded this sample entry box shall be updated with a bigger size that includes the added sinf box. If this size increase will affect the file offset of the media data, which means the media data has to be moved, in order to keep the media data in the original location, the increased metadata boxes will be copied to the location after the media data and change the original metadata box to a box that can be ignored such as a free box. Such that the decoder or player can still retrieve the metadata but the media data doesn't need to move. Another method to avoid to move the media data is that, if there is a useless box, such as a free box, existing between the increased metadata box and media data, the useless box can be reduced in size and let the metadata to expand without affecting the location of media data.

When receiving side 604 receives an encoded file having a sample entry box similar to sample entry box 800, receiving side will immediately understand that the encoded file has not been encrypted. Accordingly, decryptor 612 may pass the file directly to decoder 124 for decoding. However, when receiving side 604 receives an encoded file having a sample entry box similar to protected sample entry box 802, receiving side will immediately recognize that the encoded file has been encrypted and find the corresponding DRM client, in this case DRM device 610, based on the information inside the protection scheme information portion 812. Accordingly, decryptor 612 will get the decryption key from DRM client 610 and decrypt the file before passing to decoder 124 for decoding.

For purposes of discussion, presume that the received file is file 700 of FIG. 7, and therefore decryptor 612 will need to decrypt the file before passing to decoder 124 for decoding.

As opposed to passing an initial counter 418 and a content encryption key 132 to the encryptor 112 as with prior art MPEG 4 encryption systems, in accordance with the present invention, the DRM device derives a salting key and the content encryption key, whereas the encryptor derives the initial counter from the salting key. This will be described in greater detail below with reference to FIG. 9.

Figure 9:
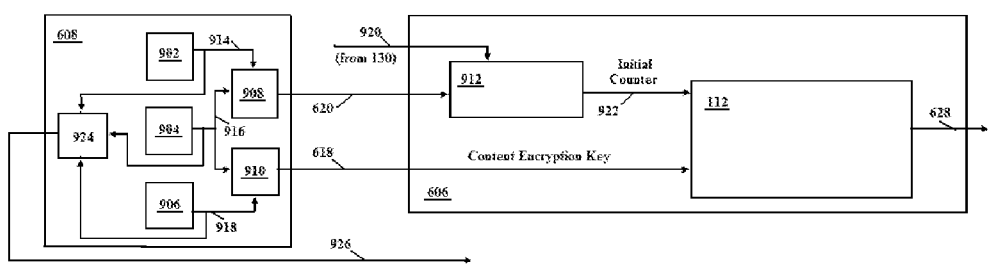
FIG. 9 is an exploded view of an example DRM device and encryptor of the example media delivery system of FIG. 6, in accordance with aspects of the present invention.

FIG. 9 is an exploded view of an example of encryptor 606 and the key derivation portion of DRM device 608 of example media delivery system 600 of FIG. 6, in accordance with aspects of the present invention, which demonstrates the difference between the present invention and the prior art.

Figure 4:
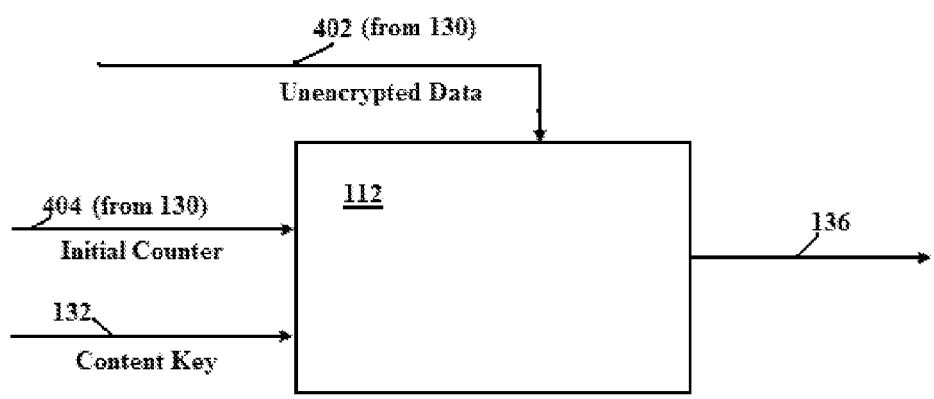
FIG. 4 is an exploded view of the encryptor of the example prior art media delivery system of FIG. 1.

As illustrated in FIG. 9, DRM device 608 includes a data portion 902, a content key seed generator 904, a DRM portion 906, a salting key derivation portion 908, an content encryption key derivation portion 910 and an encrypting portion 924. Encryptor 606 includes an initial counter generating portion 912 and encryptor 112 of FIG. 4.

Communication between any of the elements of DRM device 608 may be accomplished by way of any known communication media. Signals typically embody computer-readable instructions, data structures, program modules, or other data in a modulated data signal such as a carrier wave or other transport mechanism and include any information-delivery media. Further, in some embodiments at least one of the elements of DRM device 608 may be implemented as tangible computer-readable media for carrying or having computer-executable instructions or data structures stored thereon.

Communication between any of the elements of encryptor 606 may be accomplished by way of any known communication media. Signals typically embody computer-readable instructions, data structures, program modules, or other data in a modulated data signal such as a carrier wave or other transport mechanism and include any information-delivery media. Further, in some embodiments at least one of the elements of encryptor 606 may be implemented as tangible computer-readable media for carrying or having computer-executable instructions or data structures stored thereon.

Salting key derivation portion 908 is arranged to receive predefined data 914 and a content key seed 916 and to output salting key 620. Content encryption key derivation portion 910 is arranged to receive content key seed 916 and DRM information 918 and output content encryption key 618.

Initial counter generating portion 912 is arranged to receive data file offset 920 of the data to be encrypted and salting key 620 and to output initial counter 922. Encryptor 112 is arranged to receive an initial counter 922 and content encryption key 618.

Encrypting portion 924 is arranged to receive content key seed 916 and DRM information 918 and output the encrypted content key seed 624 and encrypted DRM information 622, which can be together indicated as encrypted information 926 and will be output to the transmitter 116 and finally transmitted to DRM device 610. In some embodiments, predefined data 914 may also be encrypted and transmitted to DRM device 610.

Data portion 902 may be any data source operable to provide data. Content key seed generator 904 may be any known seed generator, a non-limiting example of which includes a pseudo-random number generator. DRM portion 906 has DRM information therein.

The key derivation function within salting key derivation portion 908 may be any known key derivation algorithm. Salting key 620 is used as a part of initial counter 922. As salting key 620 is derived from content key seed 916, it is also kept secret to any unauthorized party. So it may complicate dictionary attacks that use pre-encryption of dictionary entries.

The key derivation function within content encryption key derivation portion 910 may be any known key derivation algorithm. In contrast with prior art system discussed above with reference to FIG. 1, in accordance with the present invention, the content key is not passed with the data file or transmitted to the receiving side directly, but is derived by the DRM device on the receiving side using content key seed 916 and DRM information 918. An unauthorized party cannot decrypt the content because content key seed 916 is encrypted using the key exchanged between DRM device 608 and DRM device 610, even if DRM information 918, predefined data 914 and key derivation algorithm may be known to the unauthorized party. So only DRM device 610 can decrypt content key seed 916, and then generate the correct content decryption key and consequently decrypt the content. However, an advantage of our a key derivation method in accordance with aspects of the present invention is: (1) as the DRM information is used in content key derivation, there is no need to generate the digital signature over the DRM information any more to authenticate the DRM information, which saves the time-consuming signing operation for the DRM information, since if anyone modifies the DRM information during transmission from DRM device 608 to DRM device 610, the content decryption key will not be derived correctly and consequently it ends up with the receiving side cannot access the content; (2) the initial counter or the salting key is derived so there is no need to signal this initial counter (or initial vector) to the decryption side through the media file, which is used by some other current media file encryption methods. In some cases, inserting the initial counter (or initial vector) into the media file is a very complicated process. Other advantages of a key derivation method in accordance with aspects of the present invention include decreased complexity and saving the bandwidth by minimizing the size of additional data added into the media file. Additionally, as the initial counter is derived from the file offset without looking for a stored initial counter from the media file, it makes the trick play of the media content easier to implement, since while doing fast-forwarding or rewinding, the decryptor does not need to look for the initial counter for the location from a certain list. Instead, it can simply derive from the file offset. Using the AES counter mode, which does not change the size of the encrypted media data and consequently does not change the file offset of the media data, the chunk offsets in the metadata are not needed to be updated, which simplifies the encryption process as well comparing with some current media file encryption methods.

Initial counter generating portion 912 is arranged to receive a file offset 920 and salting key 620 and to output an initial counter 922. The initial counter generation function within initial counter generating portion 912 may be any known counter derivation algorithm. In contrast with prior art encryptor 112 discussed above with reference to FIG. 4, in accordance with the present invention, the corresponding initial counter at the decryptor of the receiving side will generate the same initial counter.

In operation, data portion 902 provides predefined data 914 to salting key derivation portion 908. Content key seed generator 904 provides content key seed 916 to each of salting key derivation portion 908 and content encryption key derivation portion 910. DRM portion 906 provides DRM information 918 to content encryption key derivation portion 910.

In another embodiment, at least one of predefined data 914, content key seed 916 and DRM information 918 may be associated with previously stored data. For example, data file to be encrypted may stored within a memory (not shown) at transmitter side 602. In such a situation, predefined data 914, content key seed 916 and DRM information 918 may be additionally stored within the memory (not shown). When DRM device 608 is tasked with encrypting the data file, DRM device 608 may retrieve the stored predefined data 914, content key seed 916 and DRM information 918.

In another embodiment, at least one of DRM device 608 and 610 may retrieve at least one of predefined data 914, content key seed 916 and DRM information 918 based on the file information of the media file, rather than from the data within the media file.

Salting key derivation portion 902 receives content key seed 916 and predefined data 914 and generates salting key 620. Salting key 620 is then provided to initial counter generating portion 912 of encryptor 606. In another embodiment, if the unencrypted media data is in another file referenced by a data reference such as a Universal Resource Locator (URL), the data reference may be used as part of the predefined data to derive the salting key.

Content encryption key derivation portion 910 receives content key seed 916 and DRM information 918 and generates content encryption key 618. Content encryption key 618 is then provided to encryptor 112 of encryptor 606.

Initial counter generating portion 912 receives salting key 620 and file offset 920 from compressed content 130. Initial counter generating portion 912 then generates initial counter 922.

DRM device 608 must provide the required information to DRM device 610 such that DRM device 610 will be able to generate the required salting key and content decryption key. As such, DRM device 608 should provide the correct predefined data, content key seed and DRM information. However, to maintain security, this information should be encrypted. Accordingly, encrypting portion 924 encrypts predefined data 914 (if required), content key seed 916 and DRM information 918 and outputs the encrypted data as encrypted information 926. Encrypted information 926 is provided to DRM device 610 by way of transmitter 116, network 106 and receiver 118.

After initial counter 922 is generated by initial counter generating portion 912, encryptor 606 performs in a manner similar to encryptor 112.

When the media data is encoded as an MPEG 4 file, the media data may be bound by metadata. However, in accordance with the MPEG 4 standard, a decoder will recognize where the media data starts from the beginning of the data file by parsing the file. This "offset" of the start of the media data will be described in greater detail below with reference to FIG. 10.

Figure 10:
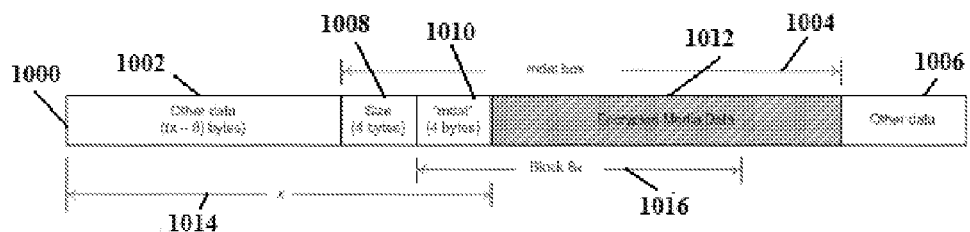
FIG. 10 illustrates a portion of an encoded data stream in accordance with an aspect of the present invention.

FIG. 10 illustrates a portion of an encoded data stream 1000 in accordance with an aspect of the present invention.

As illustrated in the figure, the portion of encoded data stream 1000 includes an other data field 1002, an mdat box field 1004 and an other data field 1006. Mdat box field 1004 includes a size field 1008, an mdat field 1010 and an encrypted media data field 1012.

As mentioned above, the offset of the media data within the encoded data file is in the number of bytes, measured from the start of the encrypted data file, to which the actual media data starts. As illustrated in FIG. 10, the offset is marked by distance 1014, wherein encrypted media data field 1012 starts. Size field 1008 indicates the size of mdat box 1004, whereas mdat field 1010 indicates that mdat box 1004 is indeed an mdat box. Fields 1008 and 1010 are not encrypted.

The location of the encrypted data within the data file is found using the file offset. If the encrypted data file is changed by someone, and consequently the file offset of encrypted data within the data file is changed, then the entire media data file cannot be decrypted correctly. In particular, in accordance with the present invention, the initial counter is derived from the file offset. If the file offset is changed, then an incorrect initial counter will be used in decrypting the data file and consequently the media data cannot be decrypted correctly. For this reason, the initial counter as generated by encoder 606 provides another level of security in encrypting MPEG 4 files to prevent from changing the location of the encrypted media data within the media file. Specifically, as mentioned above with reference to FIG. 9, if an unauthorized person attempts to decrypt the encrypted data file with the incorrect file initial counter, wherein an initial counter is determined by the file offset, the result may be an undecodable file.

If the correct offset is known, then a decryptor may decrypt all the blocks within only encrypted media data field 1012. In FIG. 10, the arrow 1016 indicates a block $B_x$ that is the cipher block where the starting media data byte resides. If using 128-bit AES, the size of the cipher block is 16 bytes (i.e. 128 bits). While encrypting the media data, if the starting byte of the media data is not at the place of the beginning of a cipher block, which means in this example the starting file offset of the media is not multiple of the cipher block size of 16 bytes, the starting byte of the media data should not XOR (exclusive or) with the first byte of the key stream for block B. Instead, if the offset is x and the cipher block size is 16 bytes, it should XOR with the number ((x % 16)+1) byte, where "%" denotes modulo. For example, if the file offset of the first byte of the media data is x=2010, $B_x$=2010/16=125, ((x % 16)+1)=((2010% 16)+1)=11. If the salting key is hexadecimal number 0x0123456789ABCDEF, $B_x$=125=0x7D, then the initial counter will be 0x0123456789ABCDEF000000000000007D. If the content key is 0x00112233445566778899AABBCCDDEEFF, the first block of key stream calculated using AES block cipher algorithm will be 0xA8716FAE527DFBE046DCF68073B3E0E5. As the starting byte of the media is the $11^{th}$ byte of No. 125 block of the file, it should XOR with the $11^{th}$ byte of the first block key stream 0xF6, and the first 10 bytes of the key stream will be dropped in this example.

Returning to FIG. 6, encryptor 606 creates file 700 from compressed content 130 by using content encryption key 618 and salting key 620. However, encryptor 606 does not encrypt the metadata of file 700, i.e. all the boxes with the exception of mdat box 710 (or all mdat boxes if more than one). Accordingly, encryptor 606 is able to determine where the media data is located, i.e., the location of mdat box 710, and only encrypt the media data. However, in contrast to encryptor 112 of FIG. 4, encryptor 606 will generate the initial counter based on file offset 920 and salting key 620. This is described in greater detail with reference to FIG. 9.

Returning to FIG. 6, once file 700 is created, encryptor 606 provides encrypted compressed content 628 to transmitter 116 for transmission as encrypted compressed content 630. Further, DRM device provides encrypted DRM information 622 and encrypted content key seed 624, and optionally encrypted predefined data 626, to transmitter 116 for transmission as encrypted information 632. Encrypted DRM information 622, encrypted content key seed 624 and encrypted predefined data 626 are the counterparts to DRM information 906, content key seed 904 and predefined data 902, respectively, that will enable DRM device 610 to derive the correct content decryption key 646 and salting key 644 and give to decryptor 612 to decrypt file 700. This will be described in greater detail below. Any known content key exchange method may be used.

For purposes of discussion, again presume that the received file is file 700 of FIG. 7, and therefore receiver 118 receives encrypted compressed content 634 and encrypted information 636. Receiver then provides encrypted DRM information 638, encrypted content key seed 642 and optionally encrypted predefined data 640 to DRM device 610 and provides encrypted compressed content 650 to decryptor 612. Optionally, if encrypted predefined data 902 is received, receiver also provides it to DRM device 610.

Having already completed hand-shake 652 with DRM device 608, DRM device 610 has the keys for decrypting encrypted DRM information 638, encrypted content key seed 642 and optionally encrypted predefined data 640. When decryptor 612 receives content it parses the file. Returning to FIG. 7, if decryptor 612 identifies encrypted compressed content, for example encv box 302, then decryptor 612 will decrypt the file. In accordance with an aspect of the present invention, decryptor 612 does not obtain the initial counter from file 700 or receive from DRM device 610. In fact, file 700 does not even include an imif box similar to imif box 308 of file 300 of FIG. 3. On the contrary, in accordance with the present invention, after DRM device 610 has decrypted encrypted DRM information 638, encrypted content key seed 642 and optionally encrypted predefined data 640, DRM device 610 will derive a content decryption key 646 and a salting key 644 using the decrypted DRM information 1118, content key seed 1116 and predefined data 1114 and provide the content decryption key 646 and salting key 644 to decryptor 612. Decryptor 612 will then generate the initial counter as will be discussed below.

As opposed to receiving an initial counter in the MPEG 4 file or from DRM device 610 as with prior art MPEG 4 decryption systems, in accordance with the present invention, the decryptor generates the initial counter using the file offset 1126 and the salting key 644. This will be described in greater detail below with reference to FIG. 11.

Figure 11:
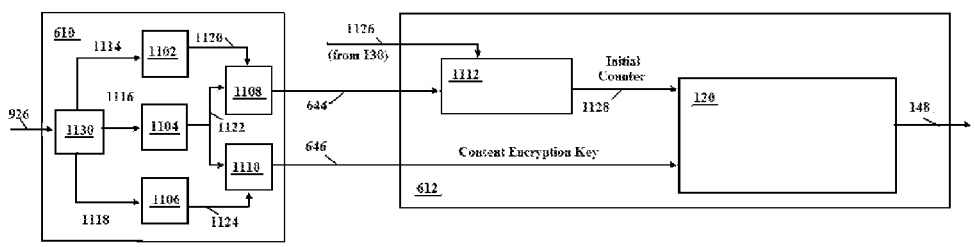
FIG. 11 is an exploded view of an example DRM device and decryptor of the example media delivery system of FIG. 6, in accordance with aspects of the present invention.

FIG. 11 is an exploded view of an example of DRM device 610 and decryptor 612 of example media delivery system 600 of FIG. 6, in accordance with aspects of the present invention.

Figure 5:
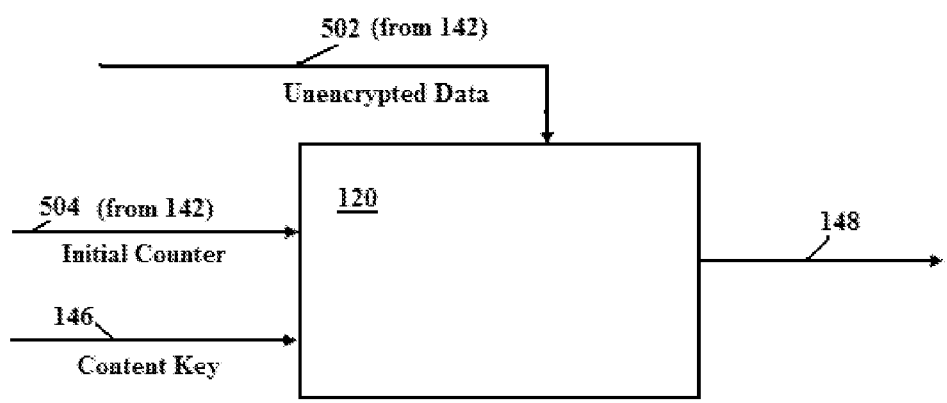
FIG. 5 is an exploded view of the decryptor of the example prior art media delivery system of FIG. 1.

As illustrated in FIG. 11, DRM device 610 includes a data portion 1102, a content key seed generator 1104, a DRM portion 1106, a salting key derivation portion 1108, a content decryption key derivation portion 1110 and a decrypting portion 1130. Decryptor 612 includes an initial counter generating portion 1112 and a decryptor 120 of FIG. 5.

Communication between any of the elements of DRM device 610 may be accomplished by way of any known communication media. Signals typically embody computer-readable instructions, data structures, program modules, or other data in a modulated data signal such as a carrier wave or other transport mechanism and include any information-delivery media. Further, in some embodiments at least one of the elements of DRM device 610 may be implemented as tangible computer-readable media for carrying or having computer-executable instructions or data structures stored thereon.

Communication between any of the elements of decryptor 612 may be accomplished by way of any known communication media. Signals typically embody computer-readable instructions, data structures, program modules, or other data in a modulated data signal such as a carrier wave or other transport mechanism and include any information-delivery media. Further, in some embodiments at least one of the elements of decryptor 612 may be implemented as tangible computer-readable media for carrying or having computer-executable instructions or data structures stored thereon.

Decrypting portion 1130 is arranged to receive encrypted information 926 and output predefined data 1114 (if included), a content key seed 1116 and DRM information 1118. Data portion 1102 is arranged to receive predefined data 1114 from decrypting portion 1130. Content key seed generator 1104 is arranged to receive content key seed 1116 from decrypting portion 1130. DRM portion 1106 is arranged to receive DRM information from decrypting portion 1130. In some embodiments, DRM device 608 may not need to send predefined data, DRM information to DRM device 610 because they may be originally provided within both DRM devices. Further, DRM device 608 may send any one of predefined data 1114, content key seed 1116 and DRM information 1118 to DRM device 610 during handshake 652.

Salting key derivation portion 1108 is arranged to receive predefined data 1120 and a content key seed 1122 and to output salting key 644. Content decryption key derivation portion 1110 is arranged to receive content key seed 1122 and DRM information 1124 and output content decryption key 646. In another embodiment, if the encrypted media data is in another file referenced by a data reference such as a Universal Resource Locator (URL), the data reference may be used as part of the predefined data to derive the salting key.

Initial counter generating portion 1112 is arranged to receive data file offset 1126 of the data to be decrypted and salting key 644 and to output the initial counter 1128. Decryptor 120 is arranged to receive an initial counter 1128 and content decryption key 646.

Data portion 1102 has predefined data 1114 therein. Content key seed generator 1104 has content key seed 1116 therein. DRM portion 1106 has DRM information 1118 therein.

The key derivation function within salting key derivation portion 1108 shall be same key derivation algorithm as in salting key derivation portion 908. Salting key 644 is used as a part of initial counter 1128. As salting key 644 is derived from content key seed 1122, it is also kept secret to any unauthorized party.

The key derivation function within content decryption key derivation portion 1110 shall be same as the key derivation algorithm used in content encryption key derivation portion 910. As mentioned above, content decryption key 646 matches content encryption key 618.

Initial counter generating portion 1112 is arranged to receive file offset 1126 and salting key 644 and to output an encrypted initial counter 1128. The initial counter generation function within initial counter generating portion 1112 shall be the same counter derivation algorithm used in initial counter generating portion 912. In contrast with prior art decryptor 120 discussed above with reference to FIG. 5, in accordance with the present invention, initial counter 1128 is derived with the same value as the corresponding initial counter at encryptor 606 of transmission side 602.

In operation, DRM device 610 receives the required information from DRM device 608 as encrypted information 926. Decrypting portion 1130 then decrypts encrypted information 926. The decrypted information is outputted as predefined data 1114 to data portion 1102; content key seed 1116 to content key seed generator 1104; and DRM information 1118 to DRM portion 1106.

In another embodiment, at least one of predefined data 1114, content key seed 1116 and DRM information 1106 may be previously stored at receiving side 604. For example, an encrypted media data file may be transferred and stored within a memory (not shown) at receiver side 604. In such a situation, predefined data 1114, content key seed 1116 and DRM information 1106 may be additionally stored within the memory (not shown) with the corresponding encrypted media data file. In another embodiment, the predefined data, content key seed and DRM information may be encrypted and stored within the memory (not shown), for example, store in encrypted information 926 within the memory. When decryptor 612 is eventually tasked with decrypting the data file, decryptor 612 may instruct DRM device 610 to provide the required information for decryption. At that point, DRM device 610 may retrieve the stored predefined data 1114, content key seed 1116 and DRM information 1106, or encrypted information 926, based the file information of the encrypted media data file (such as the file path of the encrypted media file). If predefined data 1114, content key seed 1116 and DRM information 1106 are stored inside the encrypted information 926, DRM device 610 will first decrypt them. Then DRM device 610 may derive content decryption key 646 and salting key 644 and provide content decryption key 646 and salting key 644 to decryptor 612.

Data portion 1102 provides predefined data 1120 to salting key derivation portion 1108. Content key seed generator 1104 provides content key seed 1122 to each of salting key derivation portion 1108 and content decryption key derivation portion 1110. DRM portion 1106 provides DRM information 1124 to content decryption key derivation portion 1110.

Salting key derivation portion 1108 receives content key seed 1122 and predefined data 1120 and generates salting key 644. Salting key 644 is then provided to initial counter generating portion 1112 of decryptor 612.

Content decryption key derivation portion 1110 receives content key seed 1122 and DRM information 1124 and generates content decryption key 646. Content decryption key 646 is then provided to decryptor 120 of decryptor 612.

Initial counter generating portion 1112 receives salting key 644 and file offset 1126 from compressed content 650. Initial counter generating portion 1112 then generates encrypted initial counter 1128.

After initial counter generating portion 1112 generates the initial counter using the salting key 644 and file offset 1126, encryptor 606 performs in a manner similar to encryptor 112.

When the MPEG 4 file is decrypted, in accordance with an aspect of the present invention, the protected sample entry box is converted back to a combination of sample entry box and a free box. This will be explained in greater detail below with reference to FIG. 12.

Figure 12:
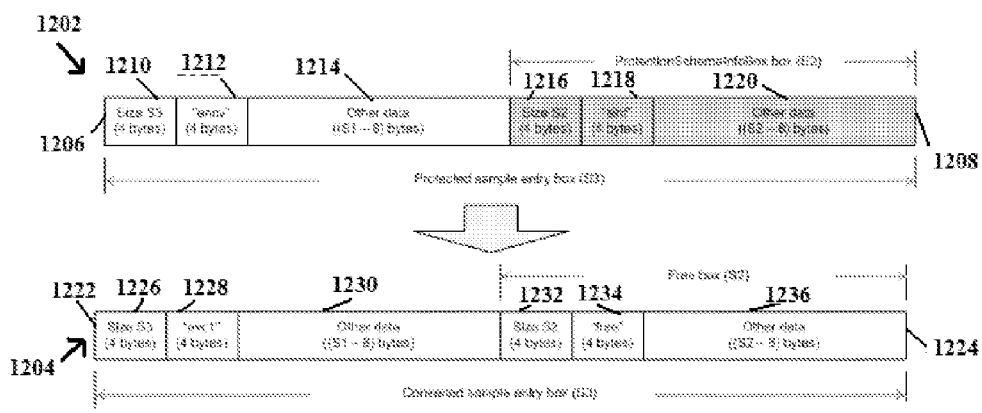
FIG. 12 illustrates an example transformation a portion of an encrypted encoded data stream to a portion of a decrypted encoded data stream in accordance with an aspect of the present invention.

FIG. 12 illustrates an example transformation from a portion of an encrypted encoded data stream to a portion of a decrypted encoded data stream in accordance with an aspect of the present invention.

FIG. 12 includes a protected sample entry box 1202 and a corresponding decrypted sample entry box 1204.

Protected sample entry box 1202 includes an unprotected portion 1206 and a protected portion 1208. Unprotected portion 1206 includes a size field 1210, an encryption field 1212 and an other data field 1214. Protected portion 1208 includes a size field 1216, a sinf field 1218 and an other data field 1220.

Size field 1210 includes information related to the size of protected sample entry box 1202. Encryption field 1212 indicates whether protected sample entry box 1202 is encrypted. Other data field 1214 may include any other data from the original sample entry box. Size field 1216 includes information related to the size of protected portion 1208. Sinf field 1218 indicates the box name of the protected portion 1208. Other data field 1220 includes the format of the original sample entry box and the information of the protection scheme.

After file 700 is decrypted by decryptor 612, protected sample entry box 1202 may take the form of unprotected sample entry box 1204.

Unprotected sample entry box 1204 includes an unprotected portion 1222 and a free box portion 1224. Unprotected portion 1222 includes a size field 1226, a data type field 1228 and an other data field 1230. Free box portion 1224 includes a size field 1232, a free field 1232 and an other data field 1236.

Size field 1226 includes information related to the size of unprotected sample entry box 1204. Data type field 1228 indicates the format of sample entry box 1204. In this case, sample entry box is not protected and the name of the original sample entry box, i.e., the name of the sample entry box prior to being converted into protected sample entry box, is restored by retrieving from sinf box 1208 (more precisely, it's retrieved from the form a box embedded inside the sinf box). In this example, the name is "avc1." Other data field 1230 may include any other data and is not changed. Size field 1232 includes information related to the size of free box portion 1224. Free field 1234 is changed from the sinf field 1218 and other data field 1236 may or may not be changed. Free box portion 1224 may be ignored by the decoder 124 and player 126 but it assures that the size of unprotected sample entry box 1204 remains the same of protected sample entry box 1202, so that the size of boxes that this free box is embedded in will not change and consequently the size of those parent boxes does not need to update.

Returning to FIG. 6, once decrypted, decryptor 612 provides compressed content 148 to decoder 124. Decoder 124 converts compressed content 148 to uncompressed content 150. In particular, using the MPEG 4 standard, decoder 124 uses the metadata within file 200 to decompress the media data within mdat box 204. As a result, uncompressed content 150 corresponds to the original uncompressed stream of data, i.e., uncompressed content 128 on the transmission side.

Media player 126 may then use uncompressed content 128. Non-limiting examples of use of uncompressed data include displaying a video, playing audio, or executing a program.

The first benefit of the present invention is an increased security when delivering encrypted media content. In a particular, because an MPEG 4 data file that has been encrypted in accordance with the present invention does not include an initial counter and any content key information an unauthorized receiver of the encrypted data file will be less likely to derive the initial counter to decrypt the data file or guess the content key to access the content. Additionally, as the initial counter is derived from the offset of the media data, if an attacker modified the file offset of the media data, the media data will not be decrypted correctly. This also prevents some sort of attacks.

The second benefit of the present invention is the simplicity of the encryption and decryption process to a media file or stream. As AES counter mode may be used in this encryption and decryption of the media content, in which the size of encrypted media data is same as the unencrypted media data and the location of every byte of the unencrypted media data is not changed, not only this does not require the metadata part to be changed to reflect where the media data is, but also it does not affect the trick play, which needs to fast forwarding and rewinding, to locate the media data rapidly. Since the initial counter or initial vectors can be derived and not needed to be inserted into the media file, it also greatly simplifies the encryption and decryption process of the media content in handling the metadata, comparing with some conventional methods currently being used. Additionally, as only the sinf box is added to the media file and the sinf box only contains the original format and the scheme type and version, the extra data added to the media file is minimized and consequently it helps to save bandwidth in delivering the media file.

The third benefit of the present invention is that the content key may be generated based on the IPR information associated with the media data within the encrypted file. Accordingly, if an attacker tries to modify the IPR information, it will also change the derived content key such that the content cannot be decrypted correctly. This helps the DRM client device to authenticate the DRM information. In this case, the DRM information may not need an extra layer authentication protection, which also simplifies and secures the delivery of the DRM information.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as

What is claimed as new and desired to be protected by Letters Patent of the United States is:

1. A method of creating an encrypted data file from a data file having a sample entry box and a media data box, the sample entry box having description information therein, the media data box including media data therein, said method comprising:
   receiving the data file;
   encrypting the media data within the media data box with an encryption key;
   replacing the sample entry box with an encoded box;
   creating a sinfbox within the encoded box;
   creating a form a box within the sinfbox; and
   creating an schm box within the sinfbox,
   wherein the schm box indicates the type of formatting of the encrypted media data,
   wherein the encoded box does not include an initial counter or initial vector that may be used to decrypt the encrypted media data; and
   wherein the initial counter is encoded with the description information, and not the media data box.

2. The method of claim 1, wherein said creating a sinfbox within the encoded box includes creating only a form a box and a schm box within the sinfbox.

3. A method of creating a data file from an encrypted data file, an encrypted key seed and intellectual property rights data, the encrypted data file having an encoded box and an encrypted media data box, the encoded box having a sinfbox therein, the sinfbox having therein a form a box and a schm box, the encrypted media data box having encrypted media data therein, the schm box indicating the type of formatting of the encrypted data file, said method comprising:
   receiving the encrypted data file;
   receiving the encrypted key seed in the encoded box, and not in the media data box;
   receiving the encrypted intellectual property rights data;
   determining the encryption scheme from the schm box;
   deriving a content decryption key based on the encrypted key seed and the intellectual property rights data;
   deriving an initial counter based on the encrypted key seed and data within the encrypted data file;
   decrypting, via the initial counter and the content decryption key, the encrypted media data within the encrypted media data box; and
   replacing the encoded box with a sample entry box.

4. The method of claim 3, further comprising creating a free box within the sample entry box.

5. A device for use with an encoder and with an intellectual property rights management device, the encoder being operable to provide a media data file and a file offset, the intellectual property rights management device having therein predetermined data and intellectual property rights data and being operable to provide an encryption key seed, the media data file having media data therein, said device comprising:
   a processor; and
   a memory connected to the processor, the memory storing code to executed by the processor to enable the processor to provide the following processing portions:
   an encrypting portion arranged to receive the media data;
   a salting key derivation portion operable to derive a salting key based on the encryption key seed;
   an content encryption key derivation portion operable to derive an content encryption key based on the encryption key seed; and
   an initial counter generating portion operable to generate an initial counter based on the salting key and the file offset,
   wherein said encrypting portion is further operable to encrypt the media data based on the initial counter and the content encryption key; and
   wherein the predefined data includes the data reference to the media data file for the media data in a different media file.

6. The device of claim 5, wherein said salting key derivation portion is operable to derive the salting key based additionally on the predefined data.

7. The device of claim 5, wherein said content encryption key derivation portion is operable to derive the content encryption key based additionally on the intellectual property rights data.

8. The device of claim 6, wherein said content encryption key derivation portion is operable to derive the content encryption key based additionally on the intellectual property rights data.

9. The device of claim 5, wherein said content encryption key derivation portion is operable to derive the content encryption key based additionally on the intellectual property rights data.

10. A device for use with a receiver and with an intellectual property rights management device, the receiver being operable to provide an encrypted media data file and a file offset, the intellectual property rights management device having therein predetermined data and intellectual property rights data and being operable to provide an encryption key seed, the encrypted media data file having encrypted media data therein, said device comprising:
    a processor; and
    a memory connected to the processor, the memory storing code to executed by the processor to enable the processor to provide the following processing portions:
    a decrypting portion arranged to receive the encrypted media data;
    a salting key derivation portion operable to derive a salting key based on the encryption key seed;
    a content encryption key derivation portion operable to derive a content encryption key based on the encryption key seed; and
    an initial counter generating portion operable to generate an initial counter based on the salting key and the file offset,
    wherein said decrypting portion is further operable to decrypt the encrypted media data based on the initial counter and the content encryption key; and
    wherein the predefined data includes the data reference to the media data file for the media data in a different media file.

11. The device of claim 10, wherein said salting key derivation portion is operable to derive the salting key based additionally on the predefined data.

12. The device of claim 11, wherein said content encryption key derivation portion is operable to derive the content encryption key based additionally on the intellectual property rights data.

13. The device of claim 10, wherein said content encryption key derivation portion is operable to derive the content encryption key based additionally on the intellectual property rights data.

* * * * *